United States Patent
Shin et al.

(10) Patent No.: US 10,067,592 B2
(45) Date of Patent: Sep. 4, 2018

(54) TOUCH PANEL INCLUDING TOUCH SENSOR AND DRIVING METHOD THEREOF

(71) Applicant: Samsung Display Co., Ltd., Yongin-si (KR)

(72) Inventors: Ji Hye Shin, Cheonan-si (KR); Soon Sung Ahn, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 386 days.

(21) Appl. No.: 14/849,019

(22) Filed: Sep. 9, 2015

(65) Prior Publication Data

US 2016/0195981 A1  Jul. 7, 2016

(30) Foreign Application Priority Data

Jan. 6, 2015  (KR) .......................... 10-2015-0001320

(51) Int. Cl.
  *G06F 3/041* (2006.01)
  *G06F 3/044* (2006.01)

(52) U.S. Cl.
  CPC ............ *G06F 3/0416* (2013.01); *G06F 3/044* (2013.01); *G06F 2203/04112* (2013.01)

(58) Field of Classification Search
  CPC ........... G06F 3/041; G06F 3/044; G06F 3/045
  See application file for complete search history.

(56) References Cited

U.S. PATENT DOCUMENTS 8,319,747 B2   11/2012  Hotelling et al.
8,766,943 B2   7/2014  Hwang et al.
2010/0321326 A1*  12/2010  Grunthaner ............. G06F 3/044
                                                    345/174
2012/0299842 A1*  11/2012  Liu ........................ G06F 3/0416
                                                    345/173
2013/0181942 A1*  7/2013  Bulea ...................... G06F 3/044
                                                    345/174

FOREIGN PATENT DOCUMENTS

KR    10-2011-0081474   7/2011
KR    10-2013-0006296   1/2013
KR    10-2013-0025266   3/2013

* cited by examiner

*Primary Examiner* — Chanh Nguyen
*Assistant Examiner* — Nguyen H Truong
(74) *Attorney, Agent, or Firm* — H.C. Park & Associates, PLC

(57) ABSTRACT

A touch panel includes: a first electrode pattern arranged in a first direction, including a plurality of first electrode cells that are physically separated from each other; a second electrode pattern arranged in a second direction crossing the first direction, including a plurality of second electrode cells that are physically separated from each other; first touch signal lines connected to the first electrode cells; and second touch signal lines connected to the second electrode cells. The electrode patterns and the touch signal lines are arranged on the same layer on a substrate such that a first virtual connection line for connecting centers of second electrode cells of a first group corresponding to an n-th first electrode cell crosses a second virtual connection line for connecting centers of second electrode cells of a second group corresponding to an (n+1)-th first electrode cell.

18 Claims, 7 Drawing Sheets

TOUCH PANEL INCLUDING TOUCH SENSOR AND DRIVING METHOD THEREOF

CROSS-REFERENCE TO RELATED APPLICATION

This application claims priority from and the benefit of Korean Patent Application No. 10-2015-0001320, filed on Jan. 6, 2015, which is hereby incorporated by reference for all purposes as if fully set forth herein.

BACKGROUND

Field

Exemplary embodiments relate to a touch panel including a touch sensor and a driving method thereof.

Discussion of the Background

Flat panel displays (FPDs) such as an organic light emitting diode display (OLED), a liquid crystal display (LCD), and an electrophoretic display (EPD) include a display panel having an electrode to which an electrical signal is applied, and an electro-optical active layer. Recently, display devices including a touch sensing function have been developed to allow interaction with an observer in addition to the image displaying function.

The touch sensing function is used to determine touch information such as whether an object has approached or touched a screen and a location of the touch by sensing changes in pressure, charge, light, and the like which are applied to the screen when the user writes text or draws figures by approaching or touching the screen using a finger or a touch pen. The display device may receive an image signal based on the contact information.

The touch sensing function may be realized by a touch sensor including a touch electrode. A panel on which the touch sensor is formed is typically called a touch panel (or a touch sensor panel or a touch screen panel), and a display panel having the touch sensor function may also be called a touch panel.

Touch panels may be classified according to the method for sensing a touch, such as a resistive type or a capacitive type.

The resistive touch panel has a configuration in which a material including a resistance component is coated on a substrate made of glass or transparent plastic and a polyester film is formed thereon. Insulating rods are installed at uniform distances apart so as to not touch one another between two surfaces of the resistive touch panel. Resistance is changed when the touch panel is touched, and a voltage change is detected to sense a touched position. The resistive touch panel has a drawback of failing to sense a weak pressure.

Conversely, regarding the capacitance touch panel, an electrode is formed on respective sides or one side of a substrate made of glass or transparent plastic, a voltage is applied between two electrodes, and an amount of capacitance between the two electrodes changes when an object such as a finger contacts the touch panel to sense a touching point.

Regarding the capacitance touch panel, a plurality of touch electrodes are connected to each other so that they may form a plurality of touch electrode rows and a plurality of touch electrode columns insulated from each other, and a driving signal is applied to the touch electrode rows and the touch electrode columns through touch signal lines. A touch sensor may drive the touch electrode rows and the touch electrode columns by using mutual capacitance formed between the touch electrode rows and the touch electrode columns, or may drive the same by using self-capacitance formed by the respective touch electrode rows and the touch electrode columns.

Further, the touch electrode rows and the touch electrode columns may be formed as a single layer or a plurality of layers. When formed to be a single layer, compared to the case of being formed as a plurality of layers, they have a relatively simple configuration so the touch panel may be structured with a less cost, but the touch signal lines are formed by the number of the touch electrodes and an area of the touch electrodes is inevitably restricted by the region occupied by the touch signal lines so touch sensitivity may also be restricted.

The above information disclosed in this Background section is only for enhancement of understanding of the background of the inventive concept and therefore it may contain information that does not form the prior art that is already known in this country to a person of ordinary skill in the art.

SUMMARY

Exemplary embodiments provide a touch panel for reducing the number of touch signal lines and increasing the sensing region.

Exemplary embodiments provide a method for driving a touch panel and improving the accuracy of a touch coordinate by preventing the generation of touch coordinate errors that may occur by expansion of the sensing region.

Additional aspects will be set forth in the detailed description which follows, and, in part, will be apparent from the disclosure, or may be learned by practice of the inventive concept.

An exemplary embodiment discloses a touch panel including at least one first electrode pattern arranged in a first direction with at least one first electrode cell that is physically separate, at least one second electrode pattern arranged in a second direction crossing the first direction with at least one second electrode cell that is physically separate, at least one first touch signal line connected to a first electrode cell, and at least one second touch signal line connected to a second electrode cell. The first and second electrode patterns and the first and second touch signal lines are provided on a same layer on a substrate, and a first virtual connection line for connecting centers of second electrode cells of a first group corresponding to an n-th first electrode cell that crosses a second virtual connection line for connecting centers of second electrode cells of a second group corresponding to an (n+1)-th first electrode cell.

An exemplary embodiment also discloses a display device comprising a display panel including at least one pixel, a touch panel including at least one touch sensor, a display controller for controlling the display panel, and a touch sensor controller for controlling the touch panel, wherein the touch panel includes at least one first electrode pattern arranged in a first direction with at least one first electrode cell that is physically separate, at least one second electrode pattern arranged in a second direction crossing the first direction with at least one second electrode cells that is physically separate, at least one first touch signal line connected to the first electrode cell, and at least one second touch signal line connected to the second electrode cell.

An exemplary embodiment of the present disclosure further provides a method for driving a touch panel including at least one first electrode pattern arranged in a first direction with at least one first electrode cell that is physically separate, at least one second electrode pattern arranged in a second direction crossing the first direction with at least one second electrode cell that is physically separate, and a coordinate value on a reference coordinate not corresponding to a coordinate value of a touch electrode coordinate based upon the disposal of the first and second electrode patterns. The method includes: storing a difference value between a coordinate value on the reference coordinate and a coordinate value on a touch electrode coordinate based on a disposal of the first and second electrode patterns as an offset value; measuring capacitance values on the touch electrode coordinates to extract a valid touch region; calculating an actually touched touch coordinate value based upon the extracted valid touch region; and storing the stored offset value on the calculated touch electrode coordinate value and outputting a coordinate value on the reference coordinate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
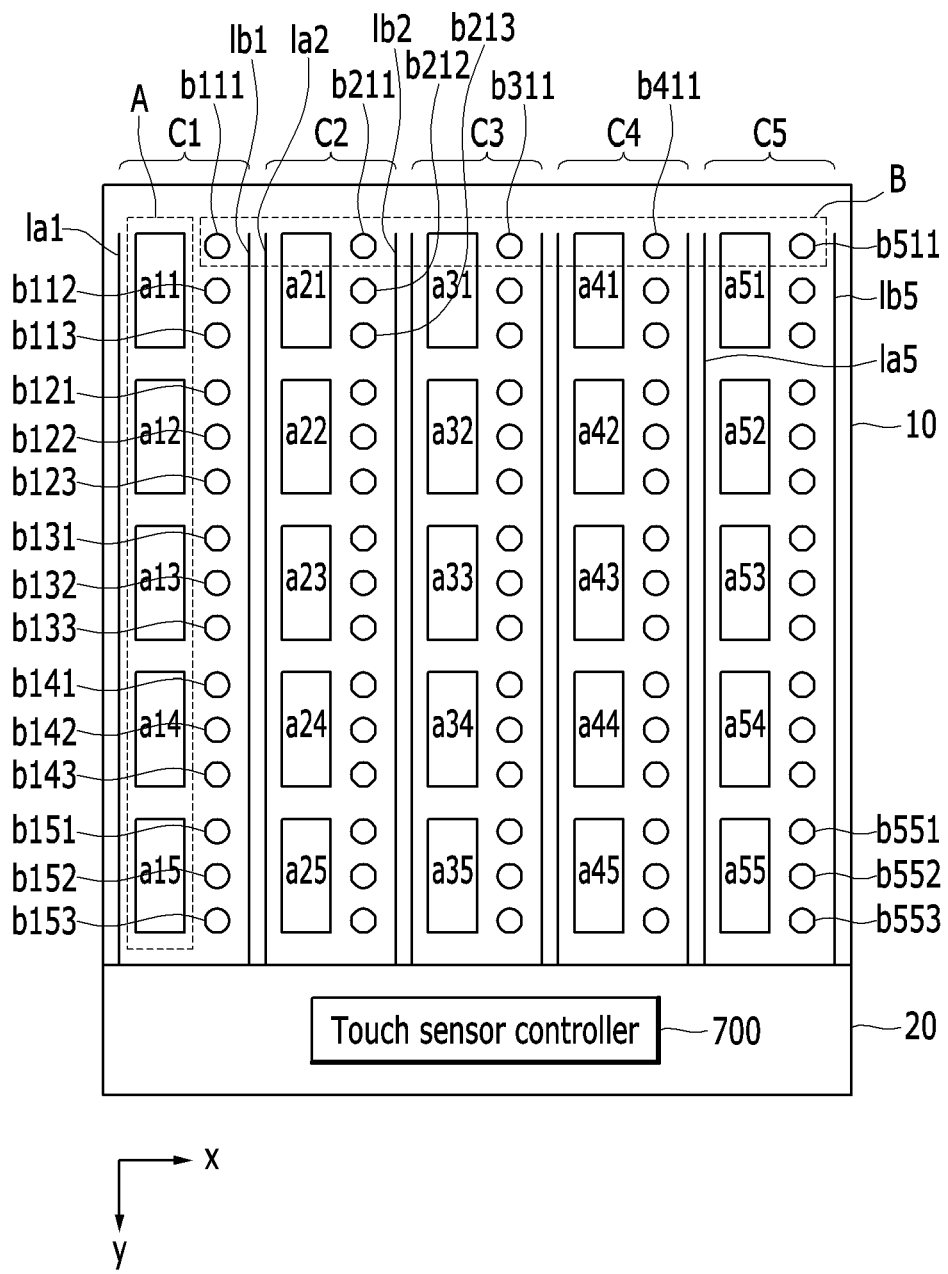
FIG. 1 shows a touch panel according to one exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

A touch panel including a touch sensor according to an exemplary embodiment will now be described in detail with reference to accompanying drawings.

FIG. 1 schematically shows an exemplary arrangement of constituent elements of the touch panel, but does not reflect an actual shape, a connection relationship, or a number of constituent elements.

Referring to FIG. 1, touch panel 10 includes a plurality of electrode patterns A and B for forming a touch sensor for sensing a contact of an external object such as a hand or a pen. Electrode patterns A and B may be formed at an outer surface of a substrate forming a display panel displaying an image (an on-cell type), or may be formed inside the display panel (an in-cell type). Also, electrode patterns A and B may be formed at a separate substrate made of a transparent insulator such as glass or plastic, and may be attached to the display panel (an add-on type).

First electrode pattern A is physically and electrically separated from second electrode pattern B. First electrode pattern A and second electrode pattern B are formed on a same layer, and are formed inside a touch region of the touch panel 10. Here, the touch region means a region sensing that the object is close when the object is hovering close or accesses touch panel 10 (a non-contact touch) as well as a case when the object directly contacts touch panel 10 (a contact touch). The touch region may overlap a display area where the image is actually displayed in the display panel, or may approximately correspond with it.

First electrode pattern A is arranged in a horizontal direction, and each first electrode pattern A includes first electrode cells a11, a12, . . . , a21, a22, . . . arranged in a vertical direction. Second electrode pattern B is arranged in the vertical direction and each second electrode pattern B includes second electrode cells b111, b211, . . . , b112, b212, . . . arranged in the horizontal direction.

In a view of the electrode cell, first electrode cells a11, . . . are arranged in a matrix direction and second electrode cells b111, . . . are also arranged in a matrix direction. Second electrode cells b111, b112, and b113 are disposed between first electrode cells a11 and a21 adjacent in the transverse direction, and first electrode cell a21 is positioned between second electrode cells bill and b211 adjacent in the horizontal direction. Accordingly, the first electrode cell and the second electrode cell are alternately disposed one by one in the horizontal direction. According to the exemplary embodiment, in the horizontal direction, the first electrode cell and the second electrode cell may be alternately disposed two by two. The second electrode cell is not positioned between first electrode cells a11 and a12, which are adjacent in the vertical direction, and the first electrode cell is not positioned between the second electrode cells bill and b112, which are adjacent in the vertical direction.

Referring to FIG. 1, for identification purposes, the first electrode cell is indicated by a rectangle and the second electrode cell is indicated by a circle, but the shape of the electrode cell is not limited thereto and the shape may vary.

The first electrode cells a11, a12, . . . of first electrode pattern A and the second electrode cells b111, b112, b113, b121, b122, b123, . . . adjacent thereto in the horizontal direction form a mutual capacitance type of touch sensor. At this time, the touch sensor controller 700 may sense the position on an x axis of touch panel 10 by using second electrode pattern B, and the position on a y axis of touch panel 10 by using first electrode pattern A. The combination of the first electrode cells and the second electrode cells forming a mutual capacitance type of touch sensor is indicated by columns C1, C2, . . . in the drawing, and the number of the columns corresponds to the number of first electrode patterns A or the number of second electrode cells included in a single second electrode pattern B.

In each column, nodes of a number corresponding to the number of second electrode cells may exist. Here, the node means the unit of a position combination that may be differentiated from each other when generating position information by mutual capacitance. In each column, one of first electrode cells a11; a12; . . . may correspond to a plurality of second electrode cells b111, b112, b113; b121, b122, b123; . . . . FIG. 1 shows an example of five groups of the first electrode cell and the second electrode cells having the above correlation in each column. Also, FIG. 1 shows an example in which a first electrode cell corresponds to three second electrode cells, and in this case, three nodes may be generated with one first electrode cell.

First electrode cells a11, a12, . . . ; a21, a22, . . . ; . . . respectively generate a self-capacitance type of touch sensor. Touch sensor controller 700 may sense the position on the x axis and the position on the y axis of touch panel 10 from each first electrode cell. According to an exemplary embodiment, second electrode cells b111, b211, . . . ; b112, b212, . . . ; . . . may also form a self-capacitance type of touch sensor individually or in a combination of more than one second electrode cell.

In each column C1, C2, . . . , first touch signal lines 1a1, 1a2, . . . connected to the first electrode cells are positioned at a side of the first electrode cells, and second touch signal lines 1b1, 1b2, . . . connected to the second electrode cells are positioned at a side of the second electrode cells. These first and second touch signal lines are formed at the same layer as the first and second electrode cells and are positioned in the touch region of touch panel 10. However, the touch signal lines positioned rightmost and leftmost may be positioned near the touch region. The detailed connection of the first and second electrode cells and the first and second touch signal lines will be described with reference to FIG. 2 to FIG. 5.

To avoid complexity of the drawing in FIG. 1, one first touch signal line is shown per column, however the first touch signal lines of the number corresponding to the number of the first electrode cells may be used. One second touch signal line is shown per column, however more than one of the second touch signal lines may be used. Accordingly, the area of electrode patterns A and B is limited by the region occupied by the first and second touch signal lines. In other words, as the area of the touch signal lines is increased, the area of the electrode patterns is decreased such that touch sensitivity may deteriorate. In FIG. 1, first touch signal lines 1a1, 1a2, . . . are disposed at the left of the first electrode cell connected thereto, and second touch signal lines (1b1, 1b2, . . . are disposed at the right of the second electrode cell connected thereto, however this does not limit the position of the first and second touch signal lines. In exemplary embodiments, the first touch signal line may be positioned at the right of the first electrode cell connected thereto, and a portion thereof may be positioned at the left and the rest thereof may be positioned at the right.

The first electrode pattern, the second electrode pattern, the first touch signal line, and the second touch signal line may be formed at the same layer. They may be formed of a transparent conductive oxide (TCO) such as indium tin oxide (ITO) and indium zinc oxide (IZO), a conductive nanowire such as silver nanowire (AgNW), or a metal mesh. In exemplary embodiments, indium tin oxide (ITO) is deposited and patterned on the substrate to simultaneously form the first and second electrode patterns and the first and second touch signal lines.

The first and second touch signal lines are connected to touch sensor controller 700 through wires (not shown) that may be positioned within sensor circuit 20. Accordingly, the first and second electrode cells may receive a touch signal such as a sensing input signal from touch sensor controller 700 through the first and second touch signal lines, and may transmit the touch signal such as a sensing output signal to touch sensor controller 700. Sensor circuit 20 may be formed near the touch region of touch panel 10, or may be formed at a separate printed circuit board (PCB) or a flexible printed circuit board (FPCB). Touch sensor controller 700 may be positioned in sensor circuit 20, or may be positioned outside of sensor circuit 20 to be connected to sensor circuit 20 through the flexible printed circuit board (FPCB).

A connection of the touch signal line will be described in detail with reference to FIG. 2 to FIG. 5.

Figure 2:
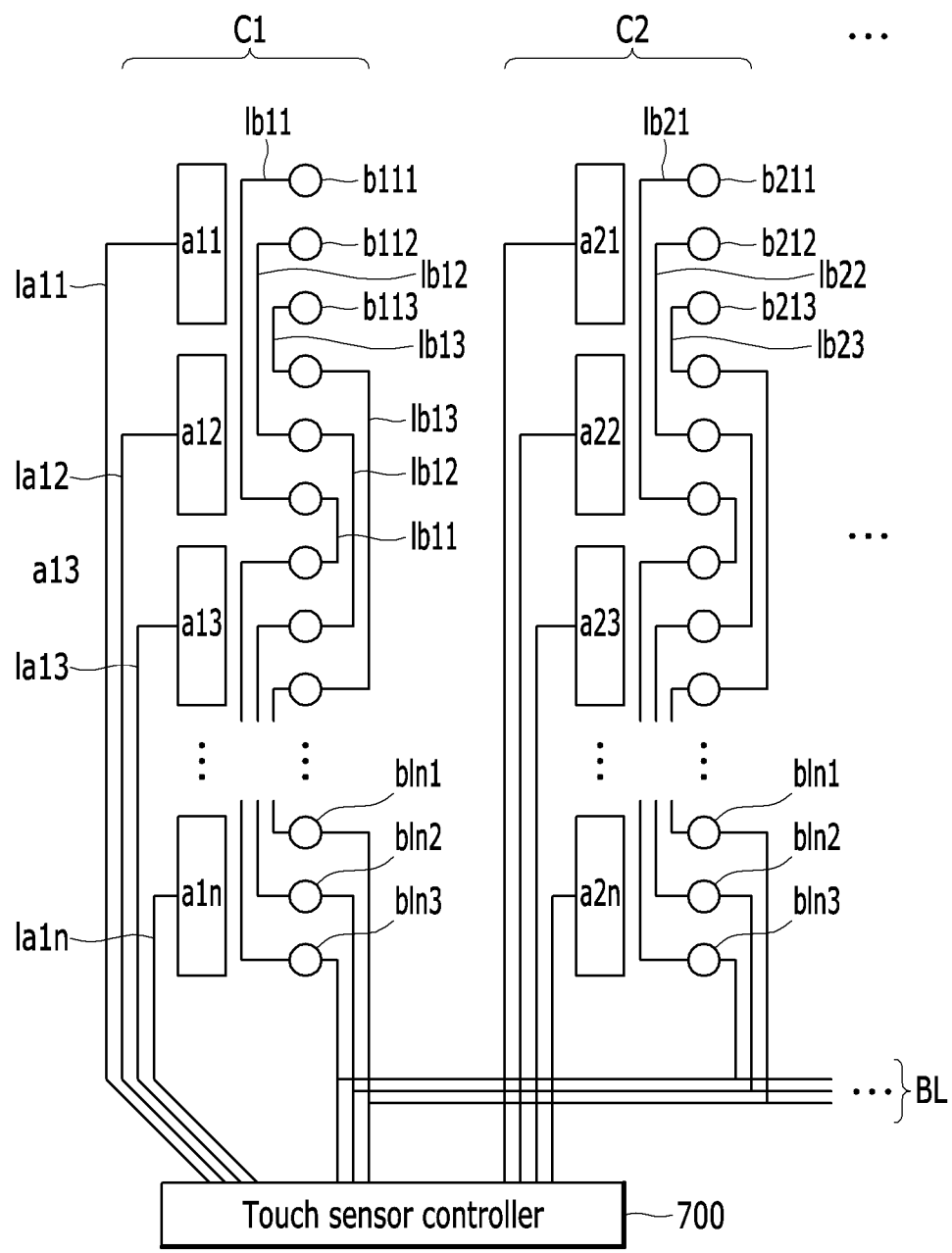
FIG. 2 and FIG. 3 show a disposal of electrodes and a connection of signal lines on a touch panel according to a first exemplary embodiment.
Figure 3:
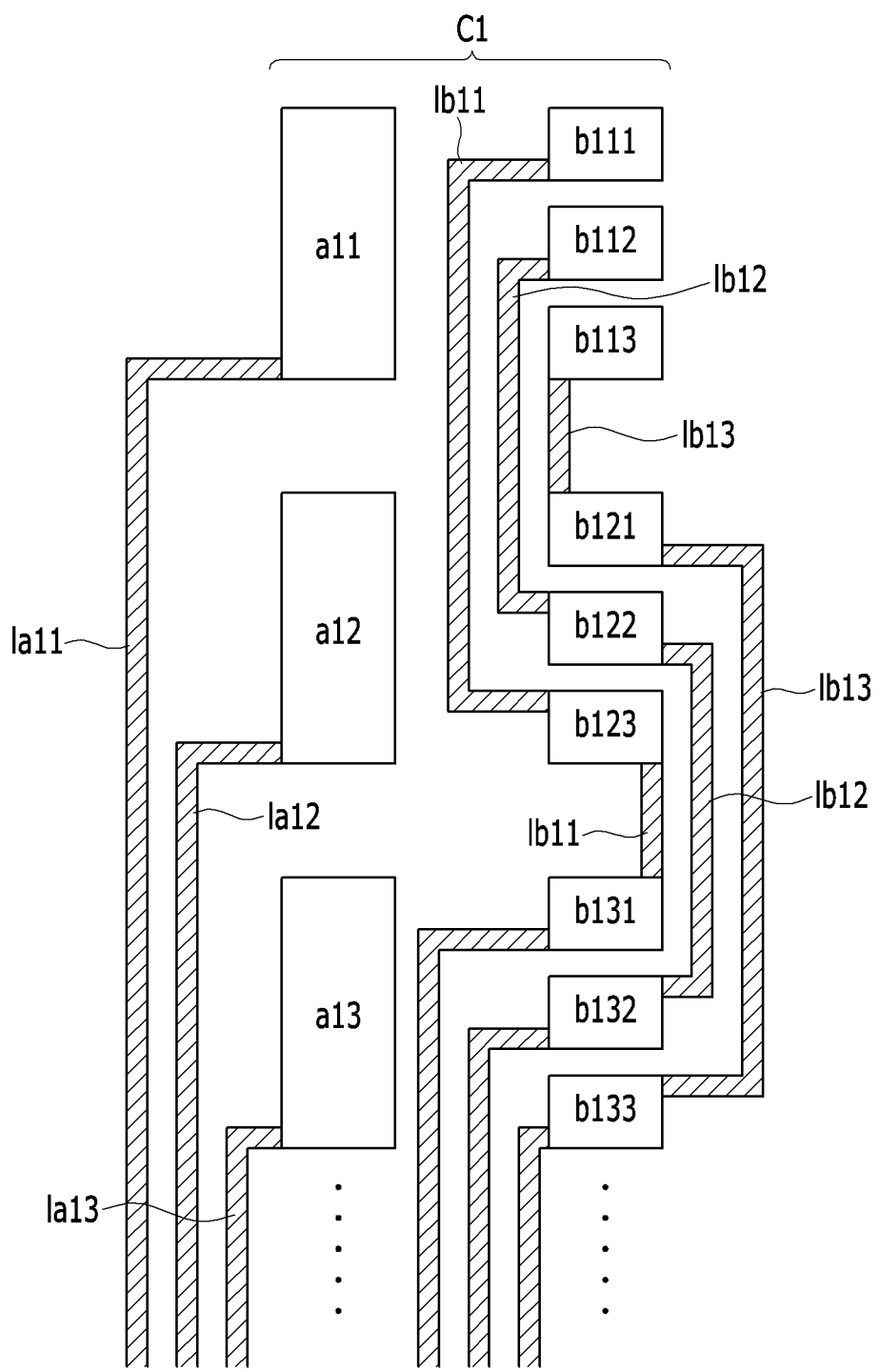

FIG. 2 and FIG. 3 show part of a touch panel according to a first exemplary embodiment.

Referring to FIG. 2, columns C1, C2, . . . including the first electrode cells and the second electrode cells, and the first touch signal lines and the second touch signal lines connected thereto, are shown. The columns C1, C2, . . . of a predetermined number exist with the same pattern in the horizontal direction on the touch panel 10. The arrangement of the first and second electrode patterns A and B is substantially the same as that shown in FIG. 1, however the first electrode cells a11, a12, . . . , a1$n$; a21, a22, . . . , a2$n$ are disposed in the vertical direction by the n number.

In the first column C1, the first electrode cells a11, a12, . . . , a1$n$ of one first electrode pattern A and the second electrode cells b111, b112, . . . , b1$n$3 of the different second electrode patterns B are disposed. Also, in the first column C1, the first touch signal lines 1a11, 1a12, . . . , 1a1$n$ are connected to the first electrode cells a11, a12, . . . , a1$n$, and the second touch signal lines 1b111, 1b112, and 1b1$n$3 are connected to the second electrode cells b111, b112, . . . , b1$n$3. These arrangement and connection are equally applied to the second column etc., C2, . . . . That is, in the second column C2, the first electrode cells a21, a22, . . . , a2$n$ of one first electrode pattern A, the second electrode cells b211, b212, . . . , b2$n$3 of the different second electrode patterns B, the first touch signal lines 1a21, 1a22, . . . , 1a2$n$, and the second touch signal lines 1b21, 1b22, and 1b23 are disposed, the first touch signal lines are connected to the first electrode cells, and the second touch signal lines are connected to the second electrode cells. The connection of the touch signal lines will be described with respect to the first column C1, unless otherwise specifically stated, the same description may also be applied to the other columns C2, . . . .

First touch signal lines 1a11, 1a12, . . . , 1a1$n$ are individually connected to first electrode cells a11, a12, . . . , a1$n$. Accordingly, the n first touch signal lines exist by the number of the first electrode cells within the first column C1. First touch signal lines 1a11, 1a12, . . . , 1a1$n$ may be positioned within the touch region and substantially extend in the vertical direction. In FIG. 2, first touch signal lines 1a11, 1a12, . . . , 1ain are a11 extended downward, however according to other exemplary embodiments, they may be extended upward, or a portion thereof may be extended downward and the rest thereof may be extended upward.

First touch signal lines 1a11, 1a12, . . . , 1ain may be individually connected to touch sensor controller 700 through the sensor circuit. Accordingly, first electrode cells a11, a12, . . . , a1$n$ may individually receive the sensing input signal driving them from touch sensor controller 700, and may individually output a sensing output signal that is changed according to the touch existence for the touch region where first electrode cells a11, a12, . . . , a1$n$ are positioned. This means that the each of first electrode cells a11, a12, . . . , a1$n$ function as a self-capacitance type of touch sensor.

The n second electrode cells may be disposed close to each first electrode cell, and FIG. 2 shows an example that three second electrode cells are disposed. In exemplary embodiments, second electrode cells b111, b112, and b113 of a first group are disposed close to 1st first electrode cell a11, and second electrode cells b121, b122, and b123 of the second group are disposed close to 2nd first electrode cell a12, and by this method, second electrode cells b1$n$1, b1$n$2, and b1$n$3 of the n-th group are disposed close to the n-th first electrode cells a1$n$.

When each group includes three second electrode cells, three second touch signal lines 1b11, 1b12, and 1b13 are connected to the second electrode cell of each group. However, differently from the case of the first electrode cell, the second touch signal lines are not individually connected, but are connected in a pair between the second electrode cells of the groups which are adjacent in the vertical direction. That is, 1st second electrode cell b11l of the first group is connected to 3rd second electrode cell b123 of the second group through second touch signal line 1b11, and 3rd second electrode cell b123 of the second group is connected to 1st second electrode cell b131 of the third group, and this connection is continued to the 1st or 3rd second electrode cell b1$n$1 or b1$n$3 of the n group. 2nd second electrode cell b112 of the second group is connected to 2nd electrode cells b122-b1$n$2 of the second to n-th group through second touch signal line 1b12. 3rd second electrode cell b113 of the first group is connected to 1st second electrode cell b121 of the second group and 3rd second electrode cell b133 of the third group through second touch signal line 1$b$ 13, and this connection is continued to the 3rd or 1st electrode cells b1$n$3 or b1$n$1 of the n-th group. Resultantly, in first column C1, only three second touch signal lines, 1$b$ 11, 1$b$ 12, and 1$b$ 13, are connected to the touch region and connected to touch sensor controller 700 through the sensor circuit.

When each group includes the n second electrode cells, the n second touch signal lines are disposed and connected. Accordingly, when the n first electrode cells (accordingly, the n groups) are disposed in each column and the m second electrode cells are disposed in each group, n+m touch signal lines are disposed in each column and n*m nodes are generated. These are the same as the number of the second electrode cells positioned in each column.

In each group, second electrode cells b111, b121, . . . , b1$n$1; b112, b122, . . . , b12$n$; . . . of the same order are not connected to each other. But second electrode cells are connected while forming the pairs b113, b121; b112, b122; b113, b121 into the close sequence in the adjacent groups. The second touch signal lines 1b11, 1b12, and 1b13 do not cross to each other and such that a short is not generated therebetween. For example, when each group includes the n second electrode cells, the 1st, 2nd, 3rd, and n-th second electrode cells of the first group are respectively connected to the n-th, (n−1)-th, (n−2)-th, and 1st second electrode cells of the second group.

In first column C1, the first electrode cell and the second electrode cell adjacent thereto form the mutual capacitance type of touch sensor. For this, the second electrode cell may receive the sensing input signal through second touch signal lines 1b11, 1b12, and 1b13, and the first electrode cell may output the sensing output signal through first touch signal lines 1a11, 1a12, . . . , 1a1$n$. The second electrode cells included in the different groups are connected to the second touch signal line, for example, if the sensing input signal is input through second touch signal line 1b11, the sensing input signal is simultaneously input to second electrode cells b111, b123, b131, . . . of each group. However, since the n first electrode cells forming the pairs along with the second electrode cells of each group are disposed and the first touch signal line is individually connected for the first electrode cell, the first electrode cell outputting the sensing output signal that is changed by the touch and the second electrode cell forming the pair along with the first electrode cell are specified to sense the position of the x axis.

The arrangement and the connection relationship of the first and second electrode cells and the first and second touch signal lines in second column C2 is the same as the case of above-described second column C1. However, in relation to first column C1, second touch signal lines 1b21, 1b22, and 1b23 in second column C2 may be connected to second touch signal lines 1b11, 1b12, and 1b13 of first column C1 through three bus lines BL (when the second touch signal lines are m, the m bus lines) of a sensing circuit. Although not shown, the second touch signal lines of the other columns are the same. By this, second electrode cells b111, b211, . . . ; b112, b212, . . . ; . . . positioned on the same row are electrically connected to each other thereby forming one second electrode pattern B. Accordingly, if the sensing input signal is applied to any one second touch signal line, the sensing input signal is input to all second electrode cells connected to the corresponding second touch signal lines. In other words, when the sensing input signal is input to any one second electrode cell of the specified second electrode pattern B, the sensing input signal is also input to all other second electrode cells of the corresponding second electrode pattern B.

FIG. 3 shows a detailed disposal of electrodes on a touch panel according to a first exemplary embodiment shown in FIG. 2.

Referring to FIG. 3, in first column C1, first electrode cells a11, a12, and a13 of one first electrode pattern A and second electrode cells b111, b112, . . . , b131, b132, b133 of different second electrode patterns B are disposed. Further, in first column C1, first touch signal lines 1a11, 1a12, and 1a13 are connected to the first electrode cells, and second touch signal lines 1b11, 1b12, and 1b13 are connected to the second electrode cells. FIG. 3 shows a detailed disposal and connection on first column C1, which is equivalently applicable to the second columns etc., C2, . . . .

Referring to FIG. 3, second electrode cells bill, b112, . . . , b131, b132, b133 are substantially arranged in series in the vertical direction.

Second electrode cells b111, b112, and b113 of the first group are connected to second electrode cells b121, b122, and b123 of the second group through second touch signal lines 1b11, 1b12, and 1b13, and referring to FIG. 3, the second electrode cells (b111, b112, . . . , b131, b132, b133) are substantially arranged in series in the vertical direction such that second touch signal lines 1b11 and 1b12 of the second touch signal lines for connecting second electrode cells b111, b112, and b113 of the first group and second electrode cells b121, b122, and b123 of the second group are bent in such a way they may not cross each other when connected. In exemplary embodiments, second touch signal line 1b 13, used for connecting second electrode cell b113 and second electrode cell b121, is substantially connected in a linear manner, and second touch signal line 1b12, used for connecting second electrode cell b112 and second electrode cell b122, may be disposed in a " ⌐ " shape so that it may not cross the second touch signal line 1b13. Further, second touch signal line 1b12, used for connecting second electrode cell bill and second electrode cell b123, may be disposed to be bent in a " ⌐ " shape so that it may not cross the second touch signal line 1b 13.

According to the disposal of electrodes and connection of signal lines on the touch panel according to the first exemplary embodiment, some of the second touch signal lines are bent and connected so a wiring region of the second touch signal lines is provided and the sensing region, which is determined by a region of the second electrode cells, is reduced.

Figure 4:
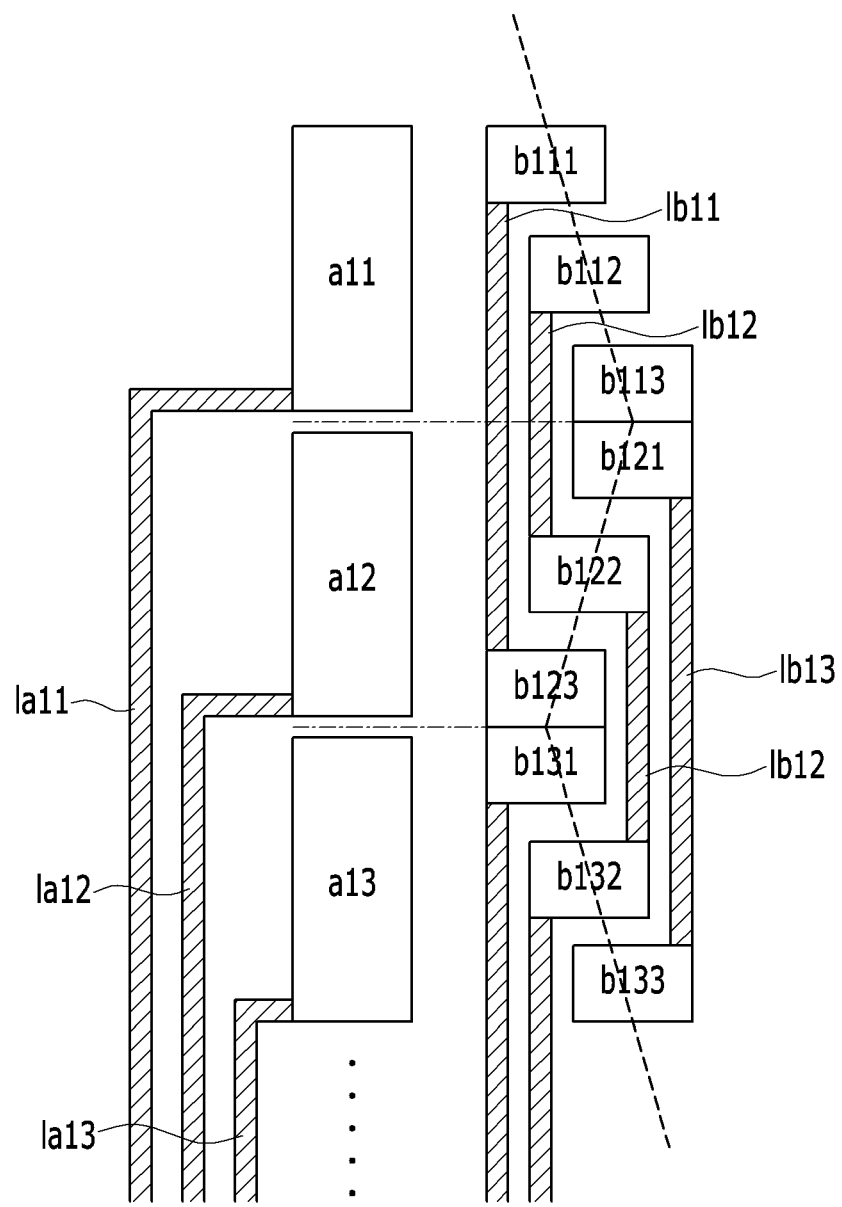
FIG. 4 and FIG. 5 show a disposal of electrodes and a connection of signal lines on a touch panel according to a second exemplary embodiment.
Figure 5:
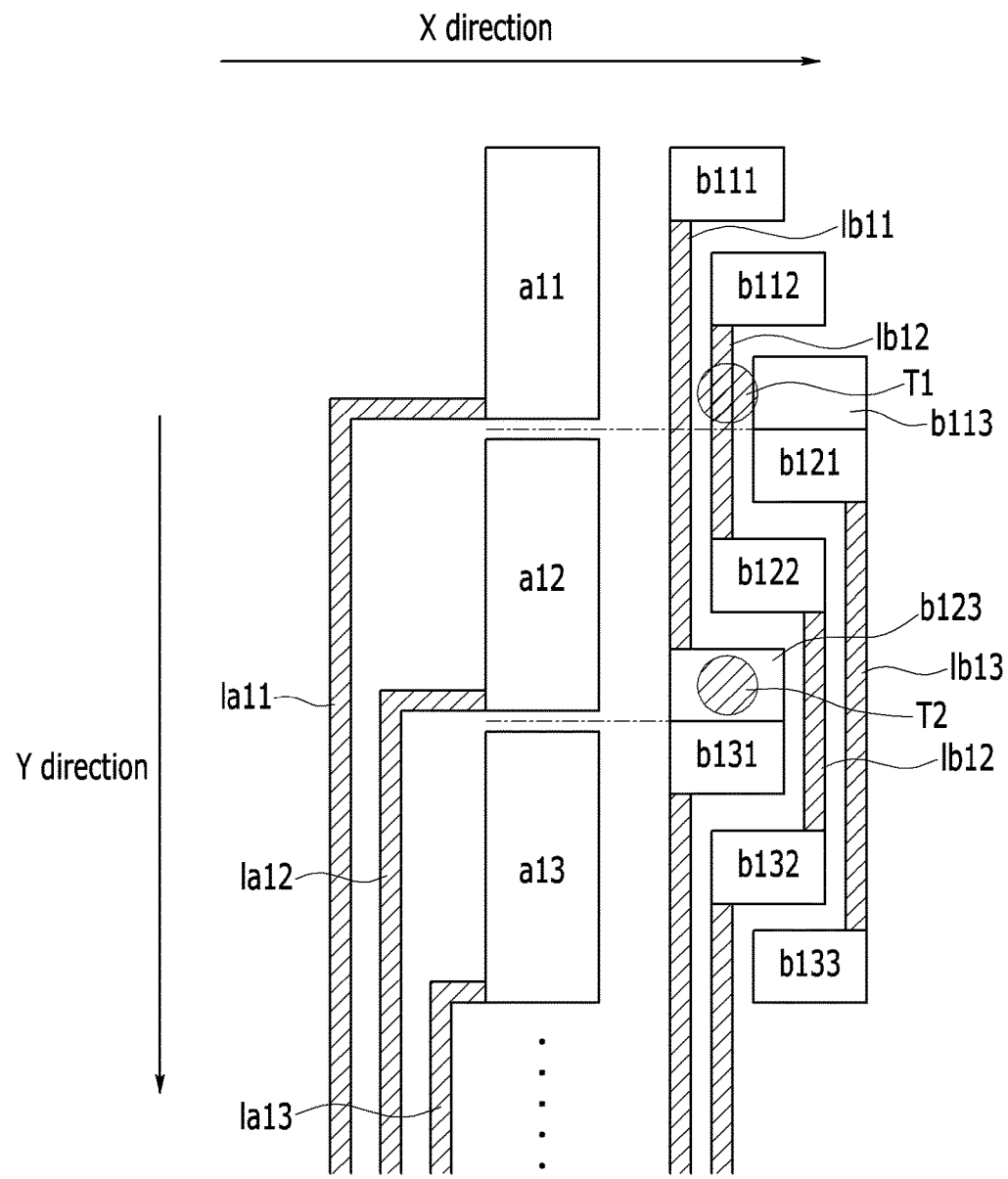

FIG. 4 and FIG. 5 show a disposal of electrodes on a touch panel according to a second exemplary embodiment.

Referring to FIG. 4, first electrode cells a11, a12, and a13 of one first electrode pattern A and second electrode cells b111, b112, . . . , b131, b132, b133 of a different second electrode pattern B are disposed in first column C1. Further, in first column C1, first touch signal lines 1a11, 1a12, and 1a13 are connected to the first electrode cells, and second touch signal lines 1b11, 1b12, and 1b13 are connected to the second electrode cells. FIG. 4 shows a detailed disposition and connection on first column C1, which is equivalently applicable to the second columns etc., (C2, . . . ).

Referring to FIG. 4, first electrode cells a11, a12, and a13 are substantially rectangular with the same size and are disposed in series in the vertical direction, and second electrode cells b111, b112, . . . , b131, b132, b133 are substantially rectangular with the same size and, differing from FIG. 3, are alternately arranged. The second touch signal lines connect the corresponding second electrode cells in a substantially linear manner.

In detail, second electrode cell b112 and second electrode cell b122 are substantially disposed in series in the vertical direction and are connected by second touch signal line 1b12, having a substantially linear form, and second electrode cell b111 and second electrode cell b123 are substantially disposed in series in the vertical direction at a position that is shifted by a predetermined distance to the left of second electrode cell b112 and are connected by second touch signal line 1b11, which has a substantially linear form. Second electrode cell b113 and second electrode cell b121 are substantially disposed in series in the vertical direction at a position that is shifted by a predetermined distance to the right of second electrode cell b112, and the two electrode cells are connected without an additional touch signal line.

Referring to FIG. 4, the second touch signal lines are exemplarily shown to connect the corresponding second electrode cells in a substantially linear form, but the present disclosure is not restricted thereto, and bent touch signal lines may also be used to connect the same.

The slope of a virtual connection line for connecting centers of second electrode cells bill, b112, and b113 corresponding to first first-electrode cell a11 has a first slope value that is a negative value, the slope of a virtual connection line for connecting centers of second electrode cells b121, b122, and b123 corresponding to second first-electrode cell a12 has a second slope value that is a positive value, and the magnitude of the first slope value substantially corresponds to the magnitude of the second slope value.

As described, according to another exemplary embodiment of the present disclosure, shown in FIG. 4, the slope of the virtual connection line for connecting the centers of the second electrode cells corresponding to the n-th first electrode cell has a first slope value (or a second slope value), the slope of the virtual connection line for connecting the centers of the second electrode cells corresponding to the (n+1)-th first electrode cell has a second slope value (or a first slope value), and the slope of the virtual connection line for connecting the centers of the second electrode cells corresponding to the (n+2)-th first electrode cell has a first slope value (or a second slope value).

According to the disposal of electrodes and connection of signal lines on the touch panel according to the second exemplary embodiment, the second electrode cells are arranged not in series in the vertical direction but alternately (e.g., the slope value of the virtual connection line for connecting the centers of the second electrode cells corresponding to the corresponding first electrode cell is repeated with the same positive value and negative value) so that the second touch signal lines connect the corresponding second electrode cells in a substantially linear form. Therefore, compared to the disposal of electrodes and connection of signal lines on the touch panel according to the first exemplary embodiment shown in FIG. 3, the wiring region of the second touch signal lines is reduced and the sensing region determined by the region of the second electrode cells is increased.

However, according to the disposal of electrodes and connection of signal lines on the touch panel according to the second exemplary embodiment, positions (i.e., positions of the x coordinate) of the sensing regions of the second electrode cells with reference to the vertical axis (y axis) are different from each other, so when the second electrode cell provided on the same position with respect to the vertical axis is touched, the position (x, y) of the actually touched coordinate is differently output from the target position.

That is, as shown in FIG. 5, when regions T1 and T2 provided on the same position with respect to the x coordinate are touched, the second electrode cell b113 is recognize as that a left portion of its cell is touched and the second electrode cell b123 is recognize as that a center portion of its cell is touched, so when the same position is touched for the x coordinate, a difference between reacting sensing regions is generated and an error for an output coordinate may be generated.

Therefore, the disposal of electrodes and connection of signal lines on the touch panel according to the second exemplary embodiment corrects a touch electrode coordinate so as to prevent generation of errors on the touch electrode coordinate that occurs when the same position is touched, which will now be described.

Figure 6:
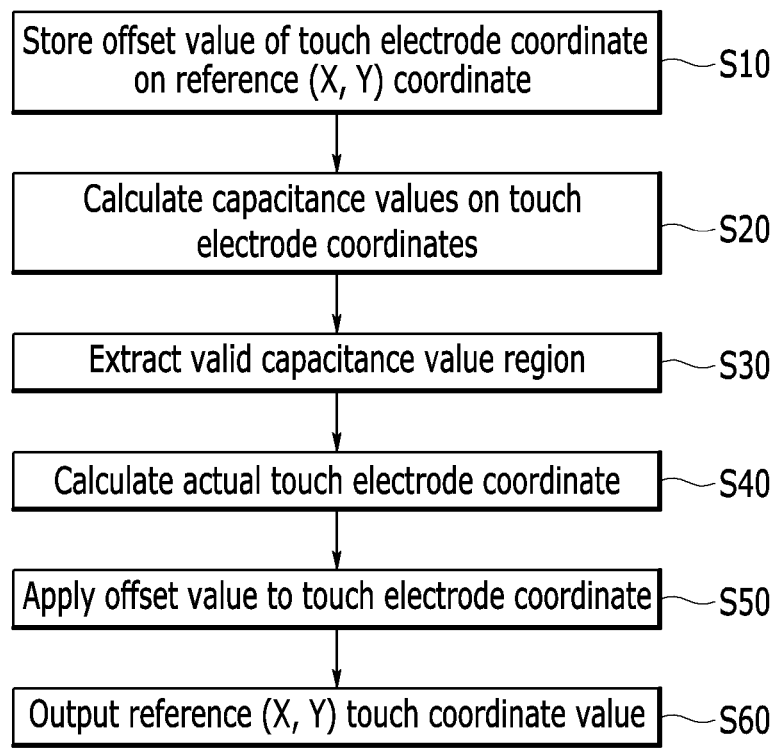
FIG. 6 shows a flowchart of a method for correcting a touch coordinate according to an exemplary embodiment.

FIG. 6 shows an operation for correcting a touch coordinate applicable in a configuration of a disposal of electrodes and a connection of signal lines on the touch panel according to the second exemplary embodiment.

The coordinate of the actually touched electrode cell will be referred to as a touch electrode coordinate, and the coordinate actually recognized and displayed by the device will be referred to as a reference coordinate. The reference coordinate represents a coordinate that is intuitively recognized by a user in the display, and signifies the general x and y coordinates.

According to the exemplary embodiment, a difference value of the touch electrode coordinate on the reference coordinate (x, y) for all electrode cells is stored as an offset value (S10).

Referring to FIG. 5, regarding touch regions T1 and T2, the x values of the reference coordinate intuitively recognized by the user are the same, but the coordinates (i.e., touch electrode coordinate) of the electrode cells actually touched are different. That is, touch region T1 is recognized as a value that is touched in the left region of second electrode cell b113, and touch region T2 is recognized as a value that is touched in the center region of second electrode cell b123.

As described, according to the exemplary embodiment, touch regions T1 and T2 have the same x coordinate value with reference to the reference coordinate, and touch region T1 is recognized as a coordinate value that is provided to the left of touch region T2 with reference to the touch electrode coordinate (i.e., the x value is recognized as a small value). Therefore, the difference value of the touch electrode coordinate on the reference coordinate (x, y) for the electrode cells is stored as an offset value (S10).

Capacitance for the touch electrode coordinates is measured. When a touch operation is performed on the touch panel, capacitance is changed in the region of the touch electrode where the touching operation is performed or in a nearby region (S20). Therefore, the capacitance values on the touch electrode coordinate may be measured. In this instance, the capacitance values are well known to a person skilled in the art so no corresponding description will be provided.

The capacitance value measured in S20 is compared with a predetermined reference value, and a region that is greater than the predetermined reference value is extracted as a valid capacitance value region (S30).

The actually touched touch coordinate value is calculated based upon the extracted valid capacitance value region (S40), the offset value found in S10 is applied to the calculated touch electrode coordinate (S50), and the coordinate value on the reference coordinate (x, y) is output.

According to another exemplary embodiment, the operation for correcting the touch coordinate is performed, thus preventing the generation of errors on the touch coordinate from occurring when the same position is touched.

The operation for correcting the touch coordinate described with reference to FIG. 6 is described based on the configuration of the electrode of the touch panel shown in FIG. 4 and FIG. 5, but exemplary embodiments are not restricted thereto, and the operation is also applicable to other configuration in which the electrode cells are not arranged in series.

Figure 7:
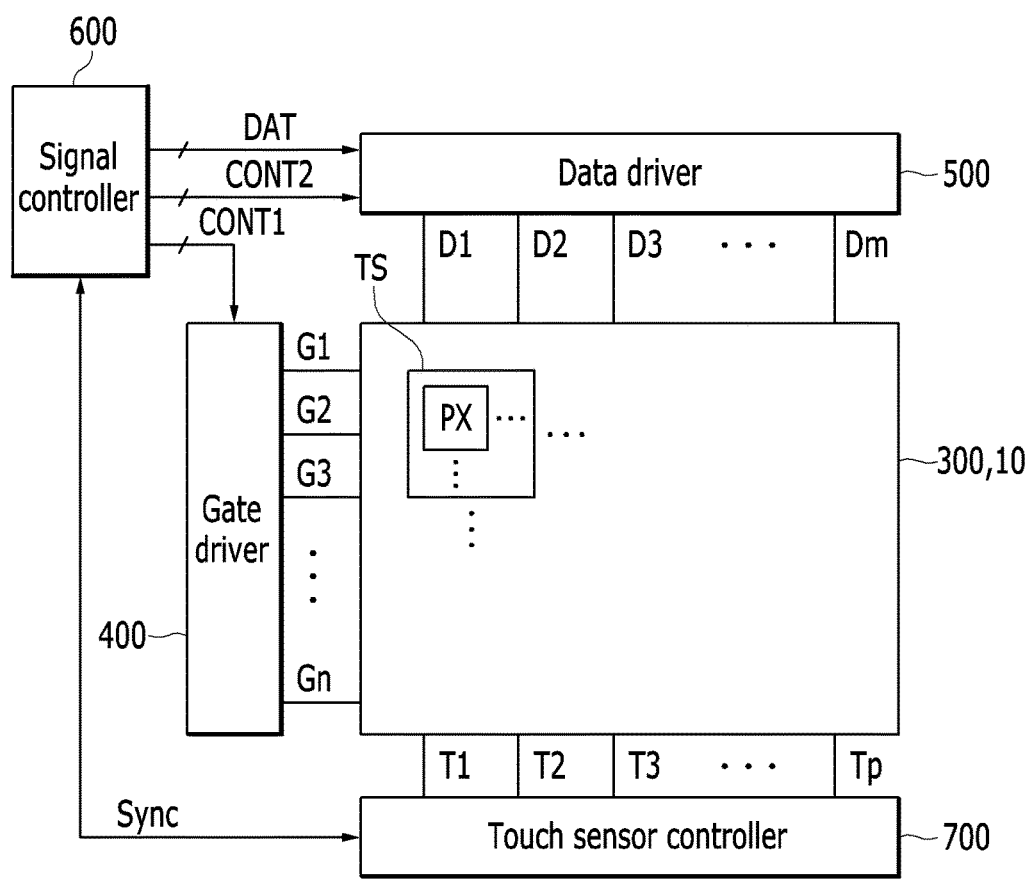
FIG. 7 shows a layout view of a display device including a touch panel according to an exemplary embodiment.

FIG. 7 shows a layout view of a display device including a touch panel according to one exemplary embodiment.

FIG. 7 exemplifies a liquid crystal display as the display device, but the exemplary embodiments are not restricted thereto, and it is also applicable to other types of display devices such as an organic emission display.

Referring to FIG. 7, the display device including a touch panel according to one exemplary embodiment includes display panel 300, gate driver 400 and data driver 500 connected thereto, and signal controller 600 for controlling gate driver 400 and data driver 500. The display device further includes touch panel 10 and touch sensor controller 700 for controlling touch panel 10. Touch panel 10 may be formed on or attached to an external side of display panel 300, or may be formed inside display panel 300.

Display panel 300 includes a plurality of gate lines (G1-Gn), a plurality of data lines (D1-Dm), and a plurality of pixels PX connected thereto and arranged in a matrix. Touch panel 10 includes a plurality of touch signal lines (T1-Tp) and a plurality of touch sensors (not shown) connected thereto and arranged in a matrix. The touch sensor is realized by the above-described first and second electrode patterns (A, B).

Gate lines (G1-Gn) are substantially extended in the horizontal direction, and may transmit a gate signal generated by combining a gate-on voltage for turning on a switching element such as a thin film transistor (TFT) connected to pixel PX and a gate-off voltage for turning it off. Data lines (D1-Dm) are substantially extended in the vertical direction, and transmit a data voltage when the switching element connected to pixel PX is turned on.

Pixel PX represents a unit element for displaying an image, and in detail, one pixel may properly express one of the primary colors or more than one pixel may alternately express the primary colors with respect to time so that it may display the desired colors by a spatial or temporal sum of the primary colors. A common voltage and a data voltage may be applied to pixel PX.

Touch signal lines T1, T2, . . . , Tp which substantially extend in the vertical direction, are connected to the touch sensor (not shown), and transmit a sensing input signal and a sensing output signal.

The touch sensor may generate a sensing output signal caused by a touch according to a mutual capacitance scheme and a self-capacitance scheme. The touch sensor may receive a sensing input signal from the touch signal lines (T1-Tp), and may output a change of capacitance caused by a touch of an external object such as a finger or a pen through the touch signal line (T1-Tp) as a sensing output signal.

Signal controller 600 receives an input image signal and corresponding control signals, which include a horizontal synchronizing signal, a vertical synchronization signal, a clock signal, and a data enable signal, from an external graphics processor (not shown). Signal controller 600 processes the image signal according to the operating condition of display panel 300 based upon the image signal and the control signal, generates image data DAT, gate control signal CONT1, data control signal CONT2, and a clock signal, and outputs them. Signal controller 600 may also output a synchronization signal Sync to touch sensor controller 700, and may receive touch information from touch sensor controller 700.

Gate driver 400 applies the gate signal, including the gate-on voltage and the gate-off voltage, to gate lines G1-Gn according to gate control signal CONT1.

Data driver 500 receives data control signal CONT2 and image data DAT from signal controller 600, and converts image data DAT into the data voltage by using gray voltage generated from a gray voltage generator (not shown) to apply the data voltage to data lines D1-Dm.

Touch sensor controller 700 transmits a sensing input signal to the touch sensor and receives a sensing output signal from the touch sensor (TS) to generate touch information. Further, as described with reference to FIG. 6, touch sensor controller 700 performs an operation for correcting the touch coordinate.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch panel, comprising: a first electrode pattern arranged in a first direction, and comprising a plurality of first electrode cells that are physically separated from each other; a second electrode pattern arranged in a second direction crossing the first direction, and comprising a plurality of second electrode cells that are physically separated from each other; first touch signal lines connected to the first electrode cells; and second touch signal lines connected to the second electrode cells, wherein: the first and second electrode patterns and the first and second touch signal lines are provided on a same layer on a substrate, a first virtual connection line for connecting centers of second electrode cells of a first group corresponding to an n-th first electrode cell is configured to cross a second virtual connection line for connecting centers of second electrode cells of a second group corresponding to an (n+1)-th first electrode cell, each of the first electrode cells are substantially the same size, each of the second electrode cells are substantially the same size, and distances between the first electrode cells and the second electrode cells vary according to the first virtual connection line and the second virtual connection line.

2. The touch panel of claim 1, wherein
a magnitude of a slope of the first virtual connection line substantially corresponds to a magnitude of a slope of the second virtual connection line.

3. The touch panel of claim 1, wherein
a slope of a third virtual connection line for connecting centers of second electrode cells of a third group corresponding to an (n+2)-th first electrode cell substantially corresponds to a slope of the first virtual connection line.

4. The touch panel of claim 1, wherein
the first electrode cell is configured to make a pair with n-numbered (n is an integer that is greater than 1) nearby second electrode cells, and
second electrode cells of the first group making a pair with the n-th first electrode cell are connected with a one by one relationship with second electrode cells of the second group making a pair with the (n+1)-th first electrode cell by n-numbered second touch signal lines.

5. The touch panel of claim 4, wherein
second electrode cells of the first group are configured to make pairs with the second electrode cells of the second group in close order and are connected to each other.

6. The touch panel of claim 4, wherein
the second touch signal line connects the corresponding second electrode cells in parallel with the first direction.

7. A display device, comprising: a display panel comprising a plurality of pixels; a touch panel comprising a plurality of touch sensors; a display controller configured to control the display panel; and a touch sensor controller configured to control the touch panel, wherein the touch panel comprises: a first electrode pattern arranged in a first direction, and comprising a plurality of first electrode cells that are physically separated from each other; a second electrode pattern arranged in a second direction crossing the first direction, and comprising a plurality of second electrode cells that are physically separated from each other; first touch signal lines connected to the first electrode cells; and second touch signal lines connected to the second electrode cells, wherein: the first and second electrode patterns and the first and second touch signal lines are provided on a same layer on a substrate, first virtual connection line for connecting centers of second electrode cells of a first group corresponding to an n-th first electrode cell is configured to cross a second virtual connection line for connecting centers of second electrode cells of a second group corresponding to an (n+1)-th first electrode cell, each of the first electrode cells are substantially the same size, each of the second electrode cells are substantially the same size, and distances between the first electrode cells and the second electrode cells vary according to the first virtual connection line and the second virtual connection line.

8. The display device of claim 7, wherein
a magnitude of a slope of the first virtual connection line substantially corresponds to a magnitude of a slope of the second virtual connection line.

9. The display device of claim 7, wherein
a slope of a third virtual connection line connecting centers of second electrode cells of a third group corresponding to an (n+2)-th first electrode cell substantially corresponds to a slope of the first virtual connection line.

10. The display device of claim 7, wherein
the first electrode cell is configured to make a pair with n-numbered (n is an integer that is greater than 1) nearby second electrode cells, and
second electrode cells of the first group making a pair with the n-th first electrode cell are connected as a one by one relationship with second electrode cells of the second group making a pair with the (n+1)-th first electrode cell by n-numbered second touch signal lines.

11. The display device of claim 10, wherein
second electrode cells of the first group are configured to make pairs with the second electrode cells of the second group in close order and are connected to each other.

12. The display device of claim 10, wherein
the second touch signal line connects the corresponding second electrode cells in parallel with the first direction.

13. The display device of claim 7, wherein
the touch sensor controller is configured to store a difference value between a coordinate value on a reference coordinate and a coordinate value on a touch electrode coordinate based on a disposal of the first and second electrode patterns as an offset value.

14. The display device of claim 13, wherein
the touch sensor controller is configured to measure capacitance values on touch electrode coordinates to extract a valid touch region, calculate an actually touched touch coordinate value based upon the extracted valid touch region, store the stored offset value on the calculated touch electrode coordinate value, and output a coordinate value on the reference coordinate.

15. A method for driving a touch panel comprising a first electrode pattern arranged in a first direction and comprising a plurality of first electrode cells that are physically separated from each other, a second electrode pattern arranged in a second direction crossing the first direction and comprising a plurality of second electrode cells that are physically separated from each other, a first virtual connection line for connecting centers of second electrode cells of a first group corresponding to an n-th first electrode cell is configured to cross a second virtual connection line for connecting centers of second electrode cells of a second group corresponding to an (n+1)-th first electrode cell, each of the first electrode cells are substantially the same size, each of the second electrode cells are substantially the same size, distances between the first electrode cells and the second electrode cells vary according to the first virtual connection line and the second virtual connection line, and a coordinate value on a reference coordinate not corresponding to a coordinate value of a touch electrode coordinate based upon a disposal of the first and second electrode patterns, the method comprising: storing a difference value between a coordinate value on the reference coordinate and a coordinate value on a touch electrode coordinate based on a disposal of the first and second electrode patterns as an offset value; measuring capacitance values on the touch electrode coordinates to extract a valid touch region; calculating an actually touched touch coordinate value based upon the extracted valid touch region; and storing the stored offset value on the calculated touch electrode coordinate value and outputting a coordinate value on the reference coordinate.

16. The method of claim 15, comprising:
arranging the first and second electrode patterns on a same layer on a substrate such that a first virtual connection line for connecting centers of second electrode cells of a first group corresponding to an n-th first electrode cell that crosses a second virtual connection line for connecting centers of second electrode cells of a second group corresponding to an (n+1)-th first electrode cell.

17. The method of claim 16, wherein
a magnitude of a slope of the first virtual connection line substantially corresponds to a magnitude of a slope of the second virtual connection line.

18. The method of claim 16, wherein
a slope of a third virtual connection line for connecting centers of second electrode cells of a third group corresponding to an (n+2)-th first electrode cell substantially corresponds to a slope of the first virtual connection line.

* * * * *